(12) United States Patent
Smyth et al.

(10) Patent No.: US 8,918,459 B2
(45) Date of Patent: Dec. 23, 2014

(54) MANAGING INSTANT MESSENGER CONTACTS AT A CONTACT CENTER

(75) Inventors: Joseph Smyth, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1878 days.

(21) Appl. No.: 11/858,448

(22) Filed: Sep. 20, 2007

(65) Prior Publication Data
US 2009/0083380 A1 Mar. 26, 2009

(51) Int. Cl.
*G06F 15/16* (2006.01)
*H04M 3/51* (2006.01)
*H04L 12/58* (2006.01)
*H04M 3/523* (2006.01)

(52) U.S. Cl.
CPC ..... *H04L 12/581* (2013.01); *H04M 2203/2011* (2013.01); *H04M 3/5191* (2013.01); *H04M 3/5238* (2013.01); *H04L 51/04* (2013.01); *H04M 3/5141* (2013.01)
USPC ............................ 709/204; 370/260; 715/733

(58) Field of Classification Search
CPC .. G06Q 10/10; H04L 29/06; H04L 29/08072; H04L 12/581
USPC ........................................................ 709/204
See application file for complete search history.

(56) References Cited

U.S. PATENT DOCUMENTS

2002/0073208 A1* 6/2002 Wilcock et al. ............... 709/227
2005/0187781 A1* 8/2005 Christensen ..................... 705/1

* cited by examiner

*Primary Examiner* — Jude Jean Gilles
*Assistant Examiner* — Jaren M Means
(74) *Attorney, Agent, or Firm* — Barnes & Thornburg LLP

(57) ABSTRACT

Instant messaging contacts received at a contact center are directed to a conference with other such contacts before being allocated to an agent. In this way, customers of the contact center are entertained while waiting and have the ability to resolve one another's problems, thereby reducing the load on the contact center's agents. In another aspect, automated instant messaging scripts interact with the customer to elucidate the nature of the customer contact before directing the contact to a human agent.

27 Claims, 5 Drawing Sheets

MANAGING INSTANT MESSENGER CONTACTS AT A CONTACT CENTER

TECHNICAL FIELD

This invention relates to the management of instant messaging (IM) contacts at a contact center.

BACKGROUND ART

Modern contact centers are equipped to handle contacts of various different media types, including voice and video telephony, emails and IM contacts. In a conventional contact center, IM contacts are handled by an IM server of the contact center which generally operates in an analogous manner to the call server or switch of the contact center in handling voice calls.

Thus, instant messaging contacts received from external parties (customers) generate a contact entity in the management systems of the contact center. That contact entity, which can be represented by a token or file, or by an object in object oriented systems, is prioritised and allocated to an agent or, if no agent is available, placed in a queue. Queuing may be organised with queues for particular skillsets. For example, the IM contact may be made to an IM address of the contact center which is associated with a particular skillset or which is associated with, for example, a particular language. In this way, a contact can be queued for an agent who is likely to be equipped to deal with the customer in question. When the contact reaches the top of its queue, it is allocated to the next available agent, and the IM server creates an IM session between the agent and the customer associated with the contact, following which the agent and customer can "chat" with one another using IM message exchanges.

Treating IM messages in this way, using the model of voice calls, does not allow the contact center provider to offer any unique services in respect of IM customers.

DISCLOSURE OF THE INVENTION

The invention provides a method of managing instant messaging (IM) contacts at a contact center, comprising the steps of:
a) receiving an IM contact from a first customer via a data network;
b) adding said IM contact to a conference with a plurality of IM contacts from other customers,
c) upon receiving an IM message from an IM contact in said conference, conveying said message to each of the other IM contacts in said conference;
d) locating an agent of said contact center suitable for participating in an IM conversation with said first customer;
e) removing said IM contact of said first customer from said conference; and
f) directing further IM messages from said first customer to said agent and vice versa to effect an IM conversation between said first customer and said agent.

As used herein, "customer" is intended to denote a party external to the contact center irrespective of whether or not that party is a "customer" in the sense of having a commercial relationship with the contact center or with a business represented by the contact center. "Customer" is thus a shorthand, as used in contact center terminology, for the other party to a contact or a communications session.

Furthermore, as set out above, the step of "receiving an IM contact" includes situations in which the initiation of the contact is made by the contact center. In such cases a human agent of the contact center or an automated system of the contact center can send an initial IM message. If this goes unanswered, then no contact is received back, other than perhaps an automated response. If, however, the customer responds in a substantive way, then the customer's response will constitute the recited step of receiving an IM contact from the customer.

By placing the first customer in a conference with other customers prior to allocating that contact to an agent, two primary objectives are achieved. Firstly, the waiting period experienced by each customer is alleviated somewhat by having the ability to chat to other users. Secondly, the possibility is created for a customer's needs to be fulfilled by the group without requiring an agent.

Experience shows that many customers access contact centers in order to seek specific information or to ask the same repeated questions. By creating an environment such as a common chat group to which all waiting contacts or a group awaiting contacts are directed while queued, an opportunity exists for the group to solve some of its own problems. Thus, one customer's query might be answered by one or more other customers in the group. This allows that first customer to disconnect from the contact center, fully satisfied, without having had to use the resources of an agent. Even if only a small percentage of customers have their queries answered in this way, this will translate directly into an alleviated load on the contact center's agent resources. Unlike many such savings, this occurs without any adverse impact on customer experience, since the customer leaves fully satisfied, and provides the further possible benefit of the customer community being brought closer together by the group interaction and assistance.

Preferably, the method further includes the step of monitoring said conference.

In one embodiment, the monitoring is carried out by communicating IM messages from said conference to a human supervisor of the contact center.

Where the conference is monitored by a supervisor, the step of locating an agent of said contact center can include receiving an input from the supervisor, and selecting the contact center agent suitable for participating in an IM conversation with said first customer, based on the supervisor's input.

Alternatively, the step of monitoring the conference can involve analysing one or more IM messages from the conference by an automatic analysis program.

Further, preferably, the program can generate information, based on those IM messages, which is used to locate a contact center agent suitable for participating in an IM conversation with said first customer.

It can be seen, therefore, that placing the customer in a pre-agent conference with other IM contacts allows human or automated means to monitor the conversation and to evaluate the selection of an agent. Thus, the conversation from the first customer can reveal that one or more skillsets are required to deal with that customer, and the human supervising agent or the automated process can guide the location of an agent in response to the analysis of the IM messages.

Preferably, when the monitoring is carried out by a human supervisor, the method further includes the step of providing the human supervisor with an interface for use in allocating said customers to contact center agents or to queues of the contact center.

The method of the invention may include adding to the conference an automated agent which is operable to generate one or more IM messages to one or more of said IM contacts in said conference.

Preferably, the automated agent generates said messages in response to the content of messages received from said IM contacts in said conference.

Preferably, said automated agent is operable to send messages privately to individual IM contacts in said conference.

Further, preferably, the automated agent is operable to generate messages for approval or alteration by a human supervisor prior to said messages being sent to the conference or to the IM contacts in the conference.

Most preferably, the automated agent is selected from a script having predetermined responses to IM messages received from the customer, and an artificial intelligence program.

In another aspect the invention provides a method of managing instant messaging (IM) contacts at a contact center, comprising the steps of:
 a) receiving an IM contact from a first customer via a data network;
 b) receiving from said IM contact an IM message and passing said received IM message as an input to an automated IM process of the contact center;
 c) said automated IM process generating an IM response message in response to said input; and
 d) forwarding said IM response message to said IM contact.

In this way, a "virtual agent" can be provided in the contact center which carries on an IM conversation with the customer based on rules programmed into said IM process. Those rules can be script rules or can be artificially intelligent processes, for example.

Preferably, the method further provides presenting the generated IM response message to a human supervisor of the contact center before the step of forwarding said IM response message to the IM contact.

In one option, the step of forwarding an IM response message is delayed until an input is received from said human supervisor.

Said input may include the human supervisor altering said message, and/or the human supervisor authorising the message to be forwarded.

In an alternative option, the step of forwarding the IM response message can be delayed until either a response is received from the human supervisor or until a timeout elapses.

In an alternative option, the message may be presented to the human supervisor and, substantially simultaneously or sequentially, forwarded to said IM contact.

In a preferred embodiment, a plurality of such automated IM processes interact with a plurality of customers under the supervision of a single human supervisor.

The above-described methods may be implemented as computer program products which comprise instructions which when executed in a data processing system of a contact center cause the steps of the methods to be performed.

DETAILED DESCRIPTION OF PREFERRED EMBODIMENTS

Figure 1:
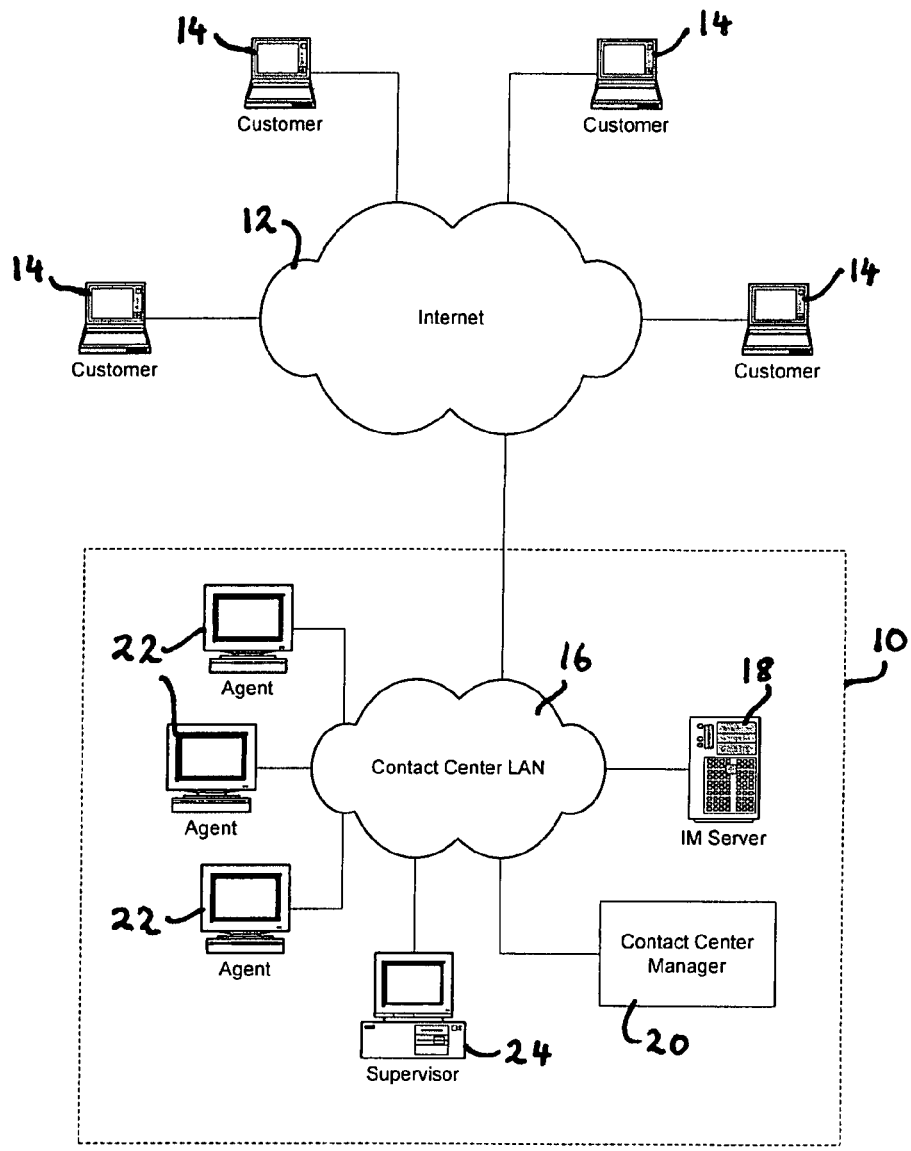
FIG. 1 is a block diagram architecture of an environment for instant messaging between a contact center and its customers.

FIG. 1 shows a contact center, indicated generally at 10, connected to the Internet 12. A number of customers 14 are also connected to the Internet and in well-known manner those customers can make contact with the contact center using various well-known communication types such as Internet telephony, email, video telephony and instant messaging (IM).

The contact center 10 is greatly simplified and only those components necessary for an understanding of the present invention are illustrated for simplicity. Incoming communications (known as contacts) are routed over a contact center local area network (LAN) 16 to a server suitable to handle that type of communication. In the present case, only an instant messaging server 18 is shown, but a typical contact center will also have an email server, a telephony server (a switch) and so on.

A contact center management application (referred to herein as contact center manager 20) is responsible for controlling the operation of the various components of the contact center and thereby controlling the routing of contacts from the customers 14 to one of a number of agents 22 who are connected by workstations to the contact center LAN 16. The contacts can also be routed to automated processes such as interactive voice response units, music-on-hold servers and so on.

A supervisor workstation 24 is also connected to the contact center LAN 16, and from this workstation a supervisor can control various aspects of operation of the contact center manager, such as to override the routing of a particular contact, to break into a conversation between an agent and a customer, to listen in on conversations, to change the priority according to which various types of contacts are handled, to control the interaction of the contact center with other contact centers forming part of a networked contact center, and so on.

The general architecture thus far shown in FIG. 1 is conventional and well known. The skilled person will also appreciate that contacts and communications can be outbound, i.e. instigated by the agent or by an automated system of the contact center to a customer, as well as inbound.

Figure 2:
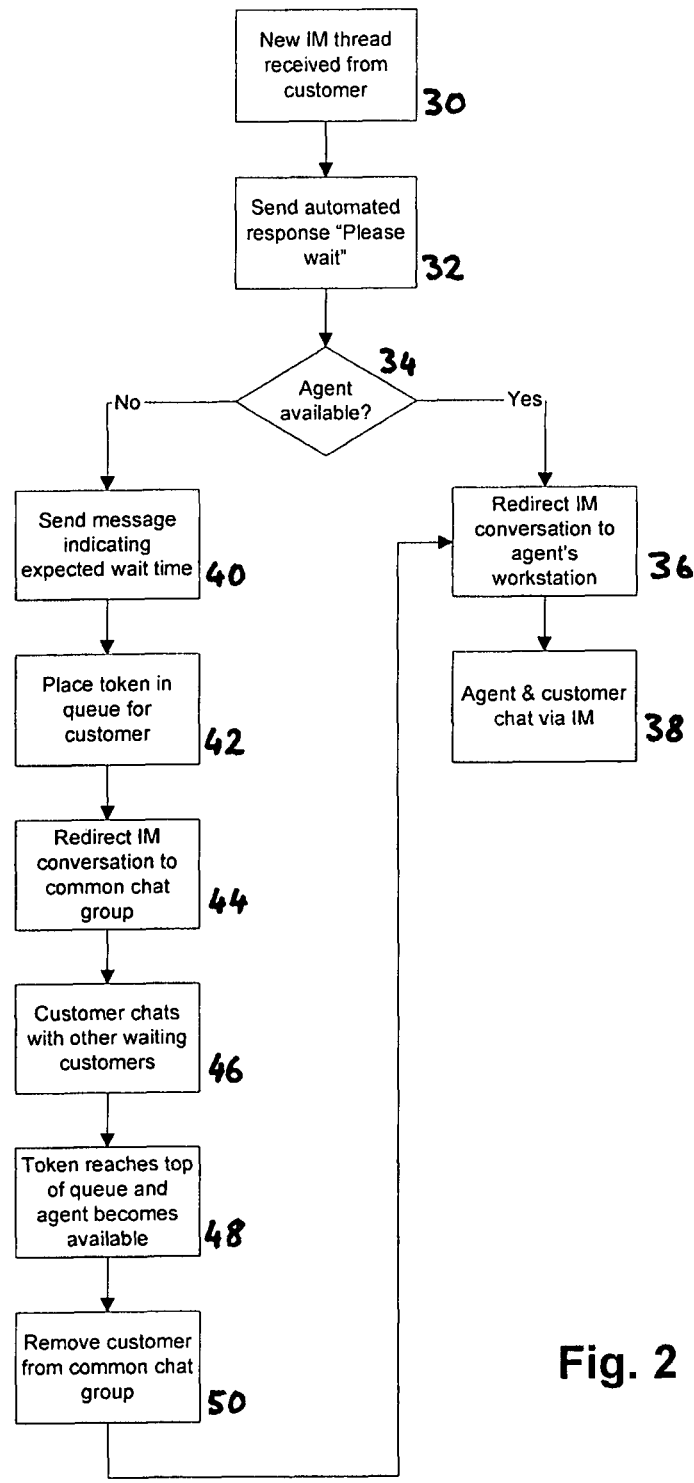
FIG. 2 is a flowchart illustrating a method of handling instant messaging at a contact center.

Referring now to FIG. 2, a process of handling an instant messaging contact according to the invention, within the framework of the FIG. 1 environment, will now be described.

When a customer initiates contact with the contact center using instant messaging, a new IM thread will be received from the customer, step 30. (Strictly speaking, instant messages are stand-alone messages, and threading (associating messages into a conversation) occurs at the application level). The IM server is configured to send an automated response, step 32, such as "Please wait". The IM server then notifies the contact center manager application 20 (FIG. 1) of the existence of a new instant messaging contact, and the contact center manager decides whether a suitable agent is available, decision 34. If an agent is available, then the contact center manager instructs the IM server to redirect the IM conversation to that available agent's workstation, step 36, following which the agent and customer can "chat" via IM, step 38, as in conventional IM processes in a contact center.

If, however, a determination is made in step 34 that there is no agent currently available, the contact center manager returns an expected wait time to the instant messaging server which formulates this in a return message to the customer, step 40. The contact center manager also places a token in a queue representing that customer contact, step 42, so that the contact will be services by an agent when it reaches the top of the queue. The mechanisms used to queue the contact can be any conventional queuing mechanism or any future development which may occur in queuing technology and can, without limitation, include prioritising the contact, queuing it to particular skillsets, allocating it to a particular group of agents based on language, and so on.

Once the customer has been provided with the expected wait time and the contact has been queued, the contact center manager instructs the IM server to redirect the IM conversation to a "common chat group", step 44. While in this chat group, the customer will see on-screen any messages sent by other members of the chat group, and messages sent by the customer will be displayed to all other members of the chat group also, step 46. In this way, the group of queued customers can interact with one another, thereby opening the possibility that the customers may assist one another and potentially allow contacts to be serviced by other customers. In such cases, the contacts can be expected to log off from the contact center without ever requiring an agent's resources to be allocated to them.

Even if a customer's problems are not solved by other customers, the common chat group provides a further benefit in that the customers are entertained by one another rather than being placed simply on hold to await the intervention of an agent.

When the token, which was queued in step 42, reaches the top of the queue, and an agent becomes available, step 48, the customer in question is removed from the common chat group, step 50 and the IM server redirects that customer's IM conversation to the agent's workstation, step 36, allowing the agent and customer to chat via IM, step 38.

Figure 3:
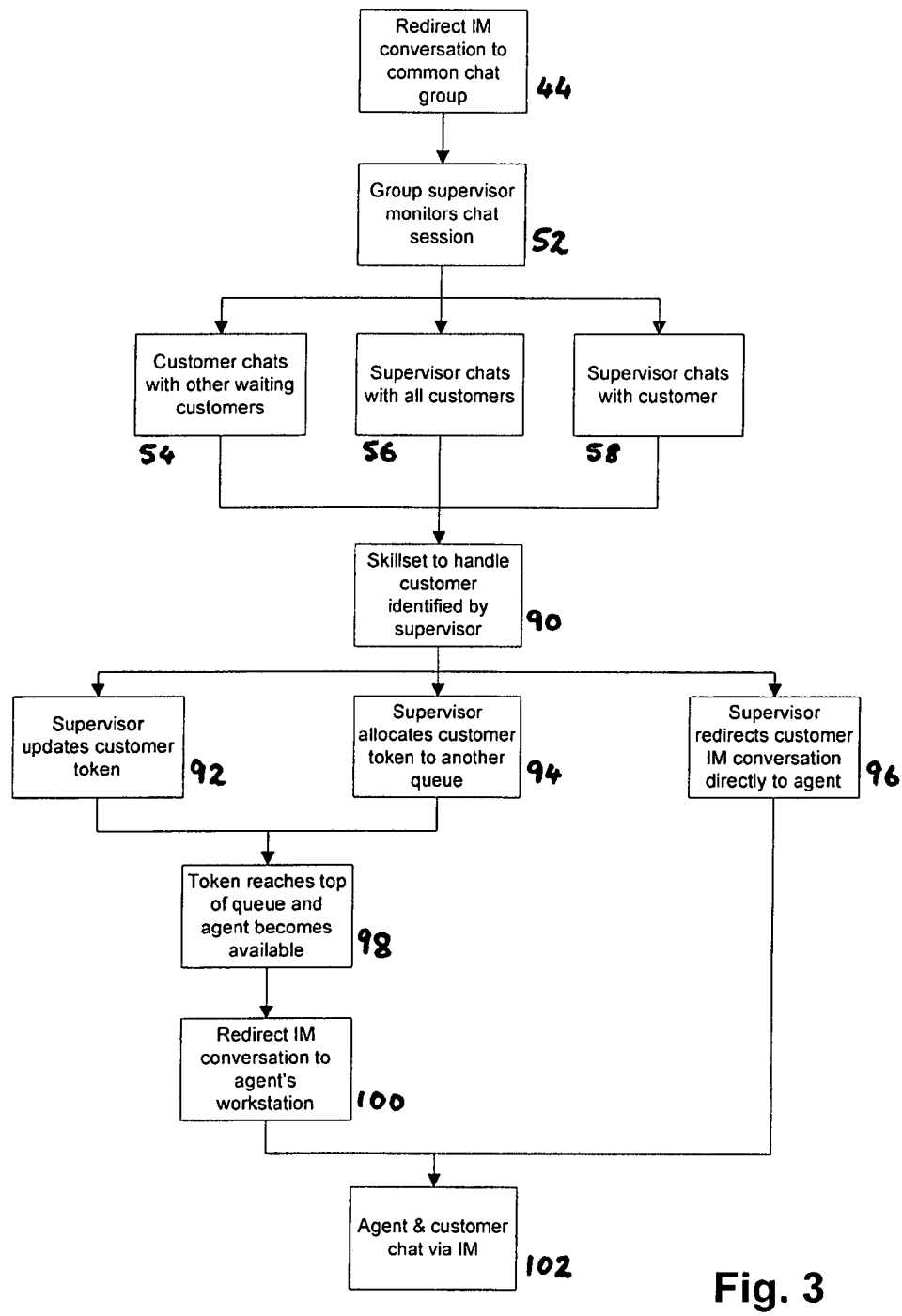
FIG. 3 is a flowchart illustrating a variation on the method of FIG. 2.

FIG. 3 shows a variation on the method of FIG. 2. Beginning at the point where the IM conversation of the customer under consideration is redirected to a common chat group, step 44, this variation includes the added feature that a group supervisor continually monitors the chat session of the common chat group, step 52. This opens up a number of possibilities. Apart from the customer chatting with other waiting customers, as previously described, step 54, the supervisor may now also chat with the group as a whole, i.e. with all customers, step 56. Thus, the supervisor may act simply as a further member of the chat session. Alternatively or additionally, the supervisor may chat with one customer, i.e. creating a private subconference with that customer, or may remove the customer from the conference for the duration of the private chat entirely, step 58.

Figure 4:
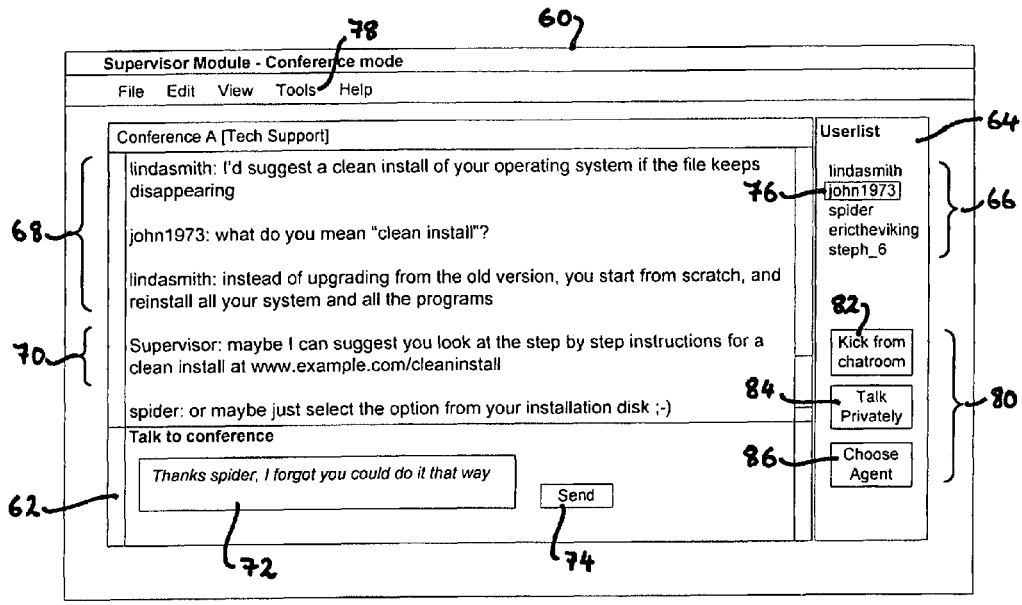
FIG. 4 is an illustration of a screen interface for a supervisor of the contact center employing the method of claim 3.

Referring additionally to FIG. 4, an example of the supervisor's screen display is shown, to illustrate some of the functionality which may be provided to a supervisor in monitoring a common chat group. The supervisor's screen shown an application, entitled Supervisor Module, 60. Within this application is a window 62 showing a chat session identified here as "Conference A" [Tech Support]. A supervisor module program could conceivably have a number of open windows, each representing a different conference under supervision of the supervisor in question.

A user list 64 indicates the individual user names of the customers 66 currently within the actively monitored window. The main window itself includes the conversation, i.e. the instant messages received from each such user 66 which are displayed to all of the other conference participants. As indicated generally at 68, individual users may chat back and forth with one another, as indicated at 70, the supervisor may interject into this open conversation by means of a text typing area 72 and send button 74.

The supervisor also has the ability to highlight particular users, as indicated at 76, and to select various options in relation to that user from a tools menu 78 or from buttons 80. For example, the supervisor may have the ability to "kick" or remove a particular user from the chat room, such as if the user is being disruptive, as indicated by button 82, or to talk privately with the user, as indicated by button 84 and described above. Additionally, if the supervisor is able to identify from the conversation in the main window that a particular user or customer requires a certain skillset, he may select the "Choose Agent" button 86, which opens a dialog box (not shown) allowing the supervisor to specify the agent's skillset, agent group or individual agent, as appropriate. That dialog, or some other mechanism like "right-clicking" on a user's name, can display contact information such as a user's history, current skillset or queue, account details, and so forth.

Referring back to FIG. 3, these options are indicated in more detail. When the supervisor identifies the required skillset to handle a particular customer in the conference under supervision, step 90, a number of options are available. In one instance the customer's token, which is already queued, is updated with a more specific indication of the appropriate skillset, priority, etc., step 92. This updating of the token may cause the automated processes within the contact center to change the position of the token within the queue, or to simply present further information to the agent when the contact is assigned to that agent. Typically, the updating of the token will not be done directly by the supervisor, but rather the supervisor will complete a dialog, selecting appropriate options, and this will cause information to be sent to the contact center manager which handles the editing of the token and any changes to the queue directly.

Alternatively, the supervisor may realise from the customer's conversation that the current queuing of the customer's token is wrong, i.e. that the customer has been allocated to the wrong skillset or has been allocated to a general skillset when there is a more suitable and specific queue available for that customer. The supervisor could alternatively spot the customer as being a problematic customer or as having a different native language, in which case the customer could be moved from to another queue entirely. Again, this can be done by means of, perhaps allowing the supervisor to look at the current queuing criteria for any individual member of the conference and to suggest changes to those criteria, with such changes being acted on by the contact center manager 20 which operates directly on the customer tokens by allocating the token to another queue, step 94.

A third option is that the supervisor may have the ability to direct a customer IM conversation directly to an agent specified by the supervisor, step 96. This option presupposes that the supervisor is trusted to override the automatic allocation of agents and is provided with sufficient information to allow the identification of a suitable agent.

Where the options represented by steps 92 and 94 are followed, i.e. modification of the customer token and its queuing, the token will ultimately reach the top of the queue and an agent will become available, step 98. At this point the IM conversation of the customer in question is redirected from the common chat group to the agent's workstation, step

100, and the agent and customer chat via IM in step 102. In the case where step 96 is followed and the customer's IM conversation is redirected by the supervisor directly to the agent, this has the effect of removing the customer from the common chat group, and placing the agent and customer in IM contact as in step 102.

Figure 5:
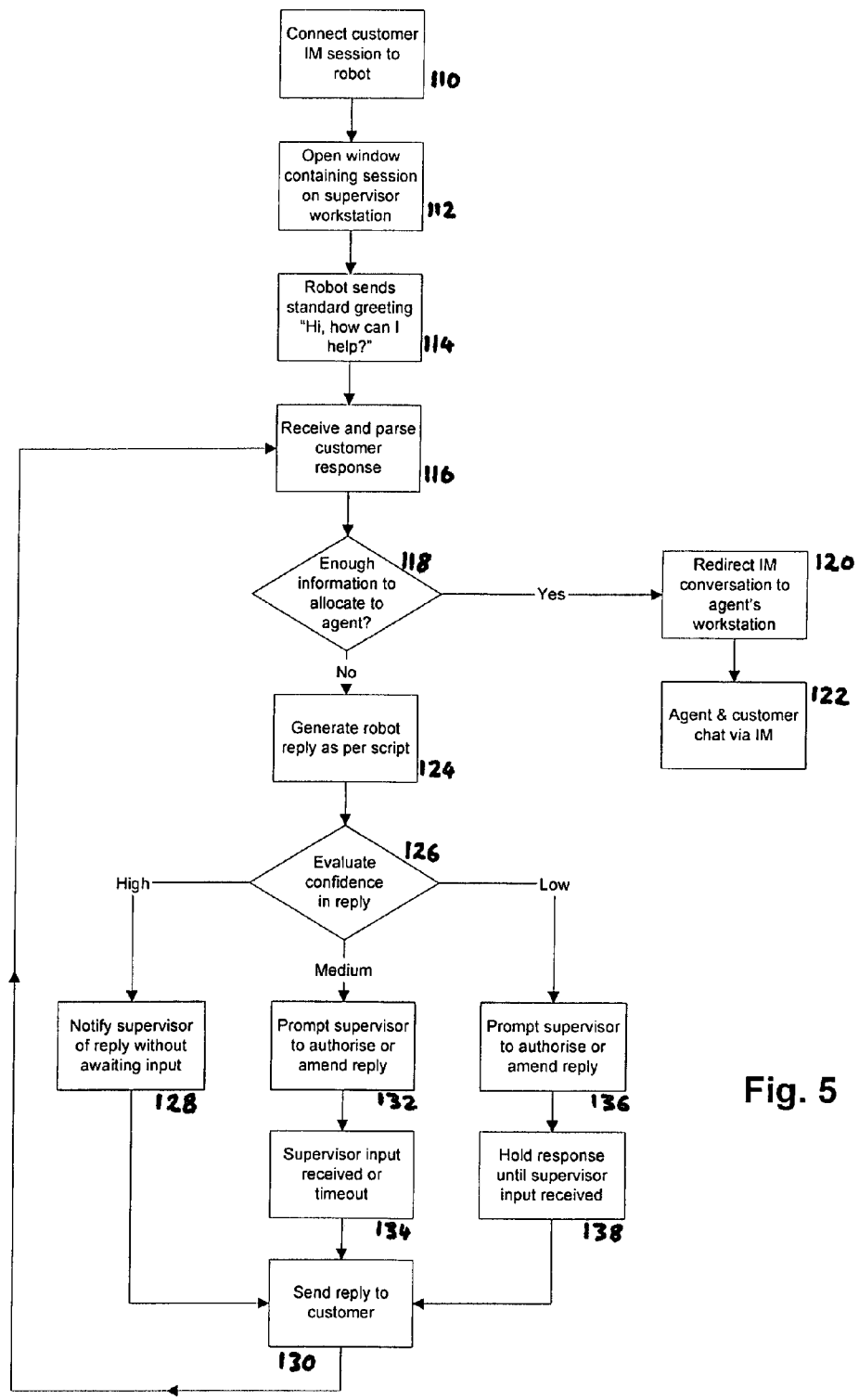
FIG. 5 is a flowchart illustrating a further method of handling instant messaging at a contact center.

FIG. 5 shows an alternative method of handling instant message contacts before they are allocated to agents. The method of FIG. 5 can be carried out either after queuing an instant messaging contact, such as following step 42 in FIG. 2 (as an alternative to the process which continues at step 44), or entirely prior to placing an IM contact in a queue or before attempting to allocate it to an agent.

The process described with reference to FIG. 5 employs what is referred to as a "robot", i.e. an automated instant messaging chat agent capable of semi-autonomous or autonomous interaction with the customer.

In step 110, the customer IM session is connected to the robot, i.e. is placed into an IM conversation with the automated IM agent running a script. A supervisor will typically be responsible for monitoring a number of such individual conversations between different customers each interacting with a script running for that customer atone. A supervisor application will contain a window for each such conversation under the supervision of that supervisor, and when the customer IM session is connected in step 110, this causes a window to open on the supervisor workstation, step 112. In this window, the messages sent by the customer and by the robot script will be displayed.

A typical script will cause the robot to send a standard greeting, step 114. It is at the option of the system designers whether the robot identifies itself as being an automated process or not. Sufficiently sophisticated systems may be able to pass themselves off as human agents, which is the preferred option. The response of the customer, i.e. the reply message to the greeting of "Hi, how can I help you?" is received and parsed in step 116. Based on any of the information in the customer's response, including identification of the customer, identification of the customer's problem, recognition of a part number or product name, key word matching, and so on, a decision is made in step 118 whether there is enough information to allocate the customer to a particular agent or skillset. If so, the IM conversation of the customer can be redirected to a particular agent's workstation or a queue suitable to the identified skillset, step 120. The decision in step 118 and the redirection in step 120 can operate automatically without any supervisor input or, more likely, will require confirmation from the supervisor that the system has "guessed" correctly and is making an appropriate recommendation for direction.

If enough information has not been gathered, according to the determination in step 118, a robot reply will be generated to the customer's input (received in step 116), in accordance with the script. The skilled person will appreciate that the script can be sophisticated and tailored to any degree possible or can be replaced by an artificially intelligent program of any sort. It is envisaged that with continued analysis of very many conversations, the robot reply can become highly directed and appropriate for almost any customer response.

In any event, a robot reply is generated in accordance with the script, step 124. Before sending this reply to the customer, a decision is made in step 126 evaluating confidence in the reply. If the confidence is evaluated as "high", then the script will simply notify the supervisor of its reply, step 128, and then send the reply to the customer without awaiting any further input, step 130. An example of this might be if the customer response to the greeting, in step 116, is "I'm having a problem with my computer". The standard robot reply to such a general complaint might be "What operating system are you running?" (if the contact center deals with software problems, for example), or "is the computer booting up and displaying a desktop?" (if the contact center is dealing with hardware problems), or simply "Perhaps you can elaborate?" (if it is simply intended to elicit more information from the customer). In any event, the script's designers may decide that one of these generic questions is a suitable reply and there is high confidence that such a reply will always be appropriate.

If the evaluation of confidence is "medium", then that proposed reply will be sent to the supervisor as a prompt to either authorise or amend the reply, step 132. The supervisor can, in response, authorise or reply as being a suitable reply (simply clicking "OK" or hitting "Enter" might suffice from the supervisor's point of view), or can amend the reply if the supervisor feels that the automated reply is not appropriate. Alternatively, the supervisor can simply take no action, in which case a timeout is reached, step 134. Because a timeout has been reached but the confidence has been evaluated as medium, i.e. as having a reasonably good probability of being a valid response anyway, input from the supervisor or an elapsed timeout causes the reply to be sent to the customer, step 130.

In cases where the confidence is evaluated as "low", this response will again be prompted to the supervisor in order to authorise or amend the reply, step 136. Since it is possible, in such cases, that the proposed response generated in step 124 is wholly inappropriate or is perhaps a blank response, the timeout rule is not applied, and in step 138 the response is held until a supervisor input is received, again either authorising or amending the reply. The response will continue to be held until such an input from the supervisor is received and no response will be sent to the customer until the supervisor has made such an input.

When the reply is sent to the customer, in step 130, whether with or without input or authorisation from the supervisor, it should prompt a further response from the customer which is received and parsed in step 116, repeating the process from that point on. At a certain point, a determination will be made that there is enough information to allocate to an agent (or perhaps, that no further information is likely to be gained and that it is time to allocate the IM to an agent), decision 118, and redirection occurs as described above, steps 120 and 122.

The benefit of this system can be seen from the fact that a supervisor can monitor a large number of automated conversations, particularly when the script is sophisticated and only a small number of low confidence replies are generated. In such cases, a single supervisor can control a team of robot agents which gather and classify information about the contacts, performing the groundwork for a human agent to take over at a certain point, or perhaps even disposing entirely of the contact by adequately responding to all of the customer's questions or concerns. Clearly, the cost of a single supervisor and a plurality of robot agents will be lower that the cost of a corresponding number of human agents having to handle each customer contact from the beginning. The robot agents provide the further benefit of occupying the customer in conversation while waiting for a human agent, making the wait more enjoyable.

While customer conferences have been described separately from robot agents, these aspects can be combined, with customers moving from an automated agent conversation to a conference, and vice versa. Also, automated agents can participate in conferences both as a means of progressing the evaluation of individual contacts and as a means of artificially filling the conference if only a small number of users are present.

Figure 6:
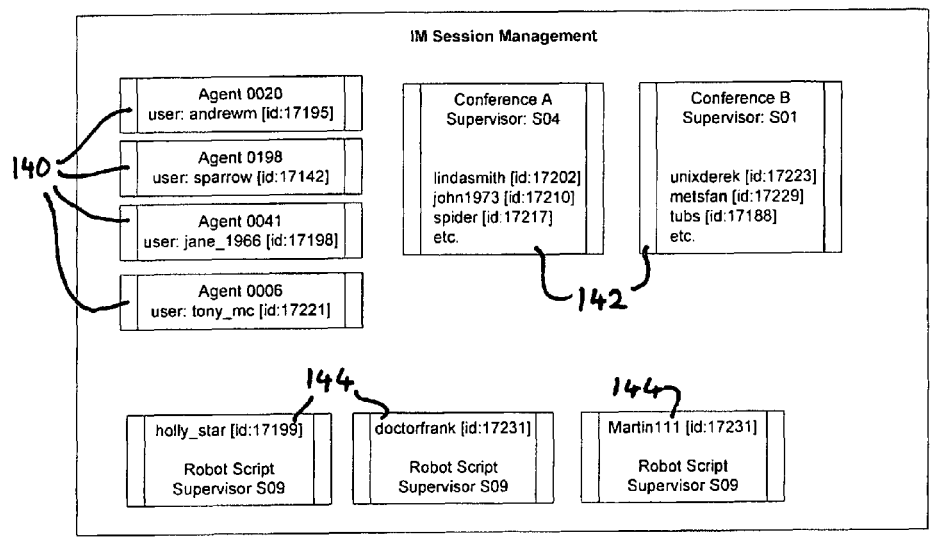
FIG. 6 is a diagrammatic overview of the instant messaging sessions handled by contact center.

FIG. 6 provides an overview of the session management environment in a simple contact center IM server. Such a server will control the forwarding of messages between an individual customer and agent, as in the case of the agent-customer sessions 140, with all messages received from a particular agent being directed to the specified customer and vice versa. Simultaneously a number of conferences are managed, such as have been described in relation to FIG. 4, and those conferences are indicated at 142, with a designation in each case of the particular supervisor and of each user (customer) participating in the conference. As indicated previously, all messages from each user and from the supervisor are, by default, communicated to all other users, while there is the possibility for the IM server to control subconferences or private conferences between the supervisor and individual users, or perhaps also for individual users to create their own subconferences.

In addition to the private conversations 140 and the conferences 142, the IM session management can also control IM sessions between individual users and robot scripts, each of which is under the supervision of a particular supervisor, as indicated at 144.

By operating such conferences and such robot scripts, the number of agents can be reduced, and the efficiency of such agents can be maximised by dealing with easier queries automatically or through the conferences and by pre-processing contacts before they reach the agents in order to elicit information about those contacts for the benefit of the agents and the more efficient routing of the contacts.

The invention is not limited to the embodiments described herein hut can be amended or modified without departing from the scope of the present invention.

What is claimed is:

1. A method of managing instant messaging (IM) contacts at a contact center, comprising the steps of:
    a) receiving an IM contact from a first customer via a data network;
    b) adding said IM contact to a conference with a plurality of IM contacts from other customers,
    c) upon receiving an IM message from an IM contact in said conference, conveying said message to each of the other IM contacts in said conference;
    d) locating an agent of said contact center suitable for participating in an IM conversation with said first customer;
    e) removing said IM contact of said first customer from said conference; and
    f) directing further IM messages from said first customer to said agent and vice versa to effect an IM conversation between said first customer and said agent.

2. A method as claimed in claim 1, wherein said IM contact received from said first customer is in response to an IM message to said first customer initiated by the contact center or a party associated therewith.

3. A method as claimed in claim 1, further includes the step of monitoring said conference.

4. A method as claimed in claim 3, wherein the monitoring is carried out by communicating IM messages from said conference to a human supervisor of the contact center.

5. A method as claimed in claim 4, further comprising the step of providing said human supervisor with an interface for use in allocating said customers to contact center agents or to queues of the contact center.

6. A method as claimed in claim 4, wherein said step of locating an agent of said contact center includes receiving an input from said human supervisor, and selecting said agent of said contact center suitable for participating in an IM conversation with said first customer based on said input.

7. A method as claimed in claim 3, wherein the step of monitoring the conference comprises analyzing one or more IM messages from the said conference by an automatic analysis program.

8. A method as claimed in claim 7, wherein said automatic analysis program generates information, based on said one or more IM messages, which is used to locate an agent of said contact center suitable for participating in an IM conversation with said first customer.

9. A method as claimed in claim 1, further comprising the step of adding to said conference an automated agent which is operable to generate one or more IM messages to one or more of said IM contacts in said conference.

10. A method as claimed in claim 9, wherein said automated agent generates said messages in response to the content of messages received from said IM contacts in said conference.

11. A method as claimed in claim 9, wherein said automated agent is operable to send messages privately to individual IM contacts in said conference.

12. A method as claimed in claim 9, wherein said automated agent is operable to generate messages for approval or alteration by a human supervisor prior to said messages being sent to the conference or to the IM contacts in the conference.

13. A method as claimed in claim 9, wherein the automated agent is selected from a script having predetermined responses to IM messages received from the customer, and an artificial intelligence program.

14. A non-transitory machine-readable storage medium comprising instructions which when executed in a data processing system of a contact center, are operable to cause said system to:
    a) receive an IM contact from a first customer via a data network;
    b) add said IM contact to a conference with a plurality of IM contacts from other customers,
    c) upon receiving an IM message from an IM contact in said conference, convey said message to each of the other IM contacts in said conference;
    d) locate an agent of said contact center suitable for participating in an IM conversation with said first customer;
    e) remove said IM contact of said first customer from said conference; and
    f) direct further IM messages from said first customer to said agent and vice versa to effect an IM conversation between said first customer and said agent.

15. A contact center comprising:
    a) an IM server with a connection to a data network;
    b) an IM conferencing program operating on said IM server for creating a conference between customers sending IM messages to the contact center, and for conveying messages sent by one customer in said conference to each of the other IM contacts in said conference;
    c) an agent allocation program for selecting an agent of said contact center suitable for participating in an IM conversation with a customer in said conference;
    d) a transfer function operable in conjunction with said conferencing program to remove said customer from said conference; and
    e) an IM conversation program operable in conjunction with said agent allocation program for directing further IM messages from said customer to said agent and vice versa to effect an IM conversation between said customer and said agent.

16. A contact center as claimed in claim 15, wherein said agent allocation program operates by monitoring IM messages within said conference and selecting a suitable agent on the basis of said messages.

17. A contact center as claimed in claim 15, wherein said agent allocation program operates by receiving an input from an operator and selecting an agent in accordance with said input.

18. A method of managing instant messaging (IM) contacts at a contact center, comprising the steps of:
   a) receiving an IM contact from a first customer via a data network;
   b) receiving from said IM contact an IM message and passing said received IM message as an input to an automated IM process of the contact center;
   c) said automated IM process generating an IM response message in response to said input; and
   d) forwarding said IM response message to said IM contact.

19. A method as claimed in claim 18, further comprising presenting said generated IM response message to a human supervisor of the contact center before said step of forwarding said IM response message to said IM contact.

20. A method as claimed in claim 18, wherein said step of forwarding said IM response message is delayed until an input is received from said human supervisor.

21. A method as claimed in claim 19, wherein said input includes said human supervisor altering said message.

22. A method as claimed in claim 19, wherein said input includes said human supervisor authorizing said message to be forwarded.

23. A method as claimed in claim 18, wherein said step of forwarding said IM response message is delayed until either a response is received from said human supervisor or a timeout elapses.

24. A method as claimed in claim 18, wherein said message is presented to said human agent and, simultaneously or sequentially, forwarded to said IM contact.

25. A method as claimed in claim 18, wherein a plurality of automated IM processes interact with a plurality of customers under the supervision of a single human agent.

26. A non-transitory machine-readable storage medium comprising instructions which when executed in data processing system associated with an instant messaging server of a contact center, are operable to cause said system to:
   a) receive an IM contact from a first customer via a data network;
   b) receive from said IM contact an IM message and pass said received IM message as an input to an automated IM process of the contact center;
   c) said automated IM process generating an IM response message in response to said input; and
   d) forward said IM response message to said IM contact.

27. An instant messaging server of a contact center, comprising:
   a) a connection to a data network for receiving an IM contact from a first customer;
   b) a message handling program which, on receiving from said IM contact an IM message, passes said received IM message as an input to an automated IM process of the contact center;
   c) a processor operating said automated IM process and generating an IM response message in response to said input; and
   d) said message handling program being further operable to forward said IM response message to said IM contact.

* * * * *